United States Patent [19]

Fries

[11] Patent Number: 5,150,827
[45] Date of Patent: Sep. 29, 1992

[54] SELF-LEVELING REFLOW SOLDER HEAD WITH DOUBLE PIVOT

[75] Inventor: William M. Fries, San Diego, Calif.
[73] Assignee: Hughes Aircraft Company, Los Angeles, Calif.
[21] Appl. No.: 796,208
[22] Filed: Nov. 22, 1991
[51] Int. Cl.⁵ .......................... B23K 3/00; B23K 20/02
[52] U.S. Cl. .................................... 228/44.7; 228/55; 228/180.2; 267/160; 267/182
[58] Field of Search ...................... 228/180.2, 212, 6.2, 228/44.7, 55; 267/158, 160, 182

[56] References Cited

U.S. PATENT DOCUMENTS

| | | | |
|---|---|---|---|
| 2,793,028 | 5/1957 | Wheeler | 267/160 |
| 3,081,552 | 3/1963 | Reason | 267/160 |
| 4,768,702 | 9/1988 | Takahashi et al. | 228/44.7 |
| 4,851,648 | 7/1989 | Jacobs et al. | 228/44.7 |
| 4,875,614 | 10/1989 | Cipolla et al. | 228/44.7 |
| 4,982,890 | 1/1991 | Schuster et al. | 228/44.7 |

Primary Examiner—Samuel M. Heinrich
Attorney, Agent, or Firm—Jeannette M. Walder; Terje Gudmestad; Wanda K. Denson-Low

[57] ABSTRACT

A reflow solder head has its heater bar (30) mounted so as to cause the heater bar to contact a tilted reflow surface (50) and align itself with the tilted surface without tip skid. The heater bar is mounted to its movable drive ram (40) by two independent pivots (36,42), both nominally positioned on a line normal to and in the center of the heater bar itself. The first pivot (36) closer to the heater bar allows the heater bar to rotate about its first point of contact (54) with the tilted reflow surface. The second pivot (42) allows lateral movement of the first pivot (36) without tip skid during the rotation of the heater bar about its first point of contact. This double pivot mechanism eliminates the tendency of the heater bar to skid along the reflow surface.

12 Claims, 3 Drawing Sheets

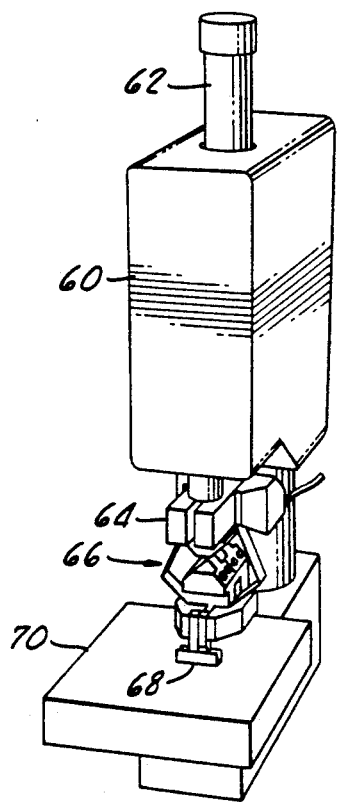
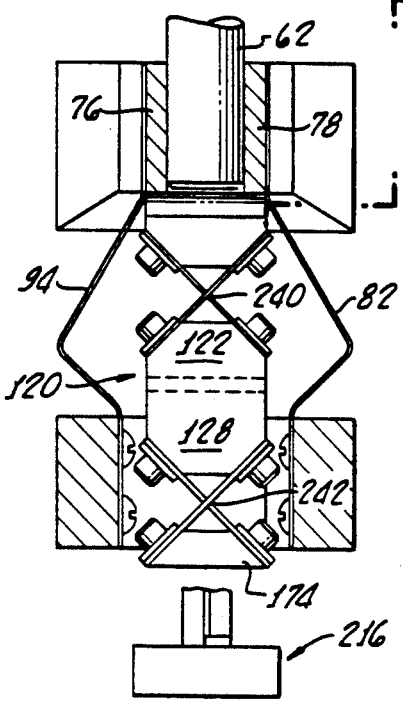
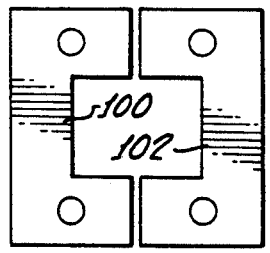
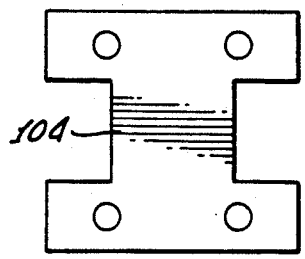
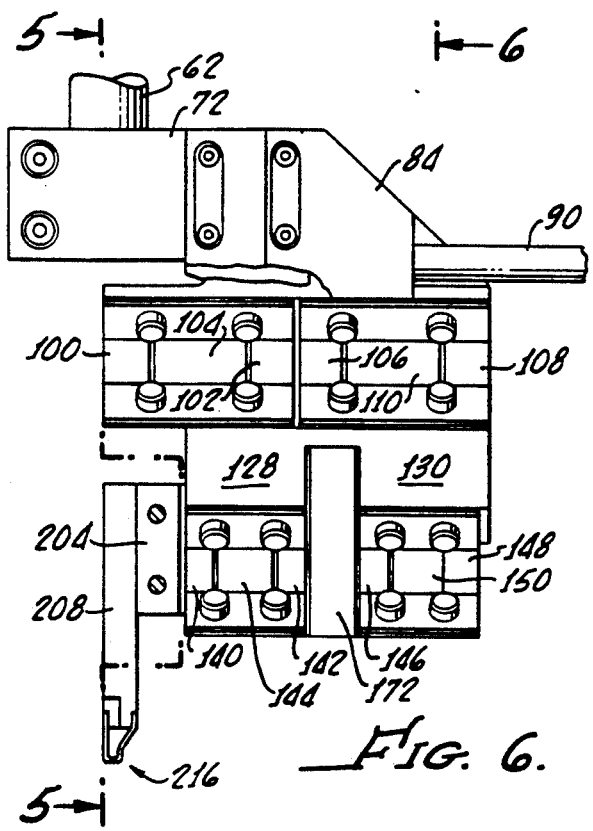

SELF-LEVELING REFLOW SOLDER HEAD WITH DOUBLE PIVOT

BACKGROUND OF THE INVENTION

1. Field of the Invention

The present invention relates to reflow soldering, and more particularly concerns reflow soldering in which tip skid of the tool tip is minimized.

2. Description of Related Art

Reflow soldering is a process for soldering together pre-tinned electrical circuit parts by application of heat and, in many processes, pressure. The heat causes the solder to melt. If the two parts are in good mechanical contact when the solder is melted, the solder from each piece will flow and coalesce. When the solder again solidifies, the two parts will be joined by the solid solder which is between them and wetted to them. Reflow soldering is used extensively in manufacture and repair of printed circuit boards. Typical applications of reflow soldering are the soldering of ribbon cable to printed circuit conductors and soldering of leads of integrated circuit chips to printed circuit conductors. Many different types and configurations of soldering tips are used. In one example of a reflow soldering operation a heater bar or thermode having a width capable of extending over a number of relatively thin, fine leads to be simultaneously soldered, is heated and lowered to contact a plurality of the pre-tinned leads that are to be connected to underlying pre-tinned connecting pads. An electric current is applied to the thermode to raise its temperature and effect flow of the solder of the pre-tinned leads and pads while the thermode is pressed against the leads. After the solder cools the heater bar is raised.

When the thermode is lowered into contact with an unleveled or tilted work surface, one edge initially will contact the work surface so that further lowering of the heater bar to align it with the unleveled or tilted work surface will cause a lateral movement, e.g. skidding, of the heater bar along the work surface. This undesired motion has been termed "tip skid". As leads of electronic devices become more minute, fragile and expensive, even small amounts of thermode tip skid can do major damage. Even minor amounts of unleveling or surface slope can result in damaging tip skid. The damage may be deformation of the leads, displacement, misalignment and consequent electronic failures.

Presently used bonding mechanisms have been arranged for various types of compliant and even pivotal mountings. For example, parallel flexure strips that mount the tool tip to its drive ram allow for vertical compliance, but allow no rotational compliance. This can result in movement of the leads, unequal pressure across the thermode and difficult set-up problems. Such a parallel flexure mounting is shown in U.S. Pat. No. 3,238,351 to W. H. Hill for Electrode Assembly Having Cantilever Suspended Electrodes. Angled compliant flexure designs, such as shown in the patent to Hill, U.S. Pat. No. 4,598,853 for Open Center Flexural Pivot Wire Bonding Head, effectively provide a virtual pivot point about the center of the heater bar but may induce distortion in the mechanism and the leads. With the pivot point effectively positioned at the center of the heater bar, tip skid still occurs and the degree of compliance in such a mechanism is limited. Virtual pivot flexures may add rotational compliance about the center of the face of the thermode, resulting in unequal pressure distribution and may cause movement of leads during rotational compliance.

Some systems employ a half bearing above the thermode, having a radius equivalent to the distance from the thermode to the bearing center. This effectively provides a virtual pivot about the center of the thermode but is not suitable for small thermodes or peg tips. Further, such mechanism is sensitive to friction, contamination and part wear.

U.S. Pat. No. 4,871,899 for Tiltable Electric Thermode for Multiple Connection Reflow Soldering employs a thermode mounted about a pivotal axis displaced well above the thermode tip and thus is subject to significant amounts of tip skid to accommodate rotation of the tip about the axis.

Accordingly, it is an object of the present invention to accomplish bonding in a manner that avoids or minimizes above mentioned problems.

SUMMARY OF THE INVENTION

In carrying out principles of the present invention in accordance with a preferred embodiment thereof a tool tip is adapted to be moved in a selected direction toward a workpiece that has an unknown tilt relative to the direction so that an edge of the tool tip will contact the workpiece at an initial contact point, and further motion of the tool past the initial contact point will cause the tool tip to rotate and align itself with the workpiece. The tool tip is coupled to a ram drive means by a mounting mechanism that allows the tool tip to rotate about the initial contact point without translation relative to the workpiece surface. The tool tip is connected to the ram drive means by a double pivot link drive arm that has a pivotal connection to the tool tip and is mounted to the ram drive means to enable lateral motion of the pivotal connection. Specifically, a double pivot link is connected between the ram drive means and the tool tip by first and second pivots nominally lying on a line parallel to the direction of motion of the tool tip and extending through the center of the tool tip.

BRIEF DESCRIPTION OF THE DRAWINGS

In the accompanying drawings:

FIG. 4 is a pictorial illustration of a reflow solder head having a double pivot mounting of the present invention;

FIGS. 5 and 6 are sections taken respectively on lines 5—5 of FIG. 6 and lines 6—6 of FIG. 5, which comprise sectional views of the apparatus of FIG. 4;

FIGS. 8 and 9 show configurations of typical outside and inside flexures.

DESCRIPTION OF THE PREFERRED EMBODIMENTS

Figure 1:
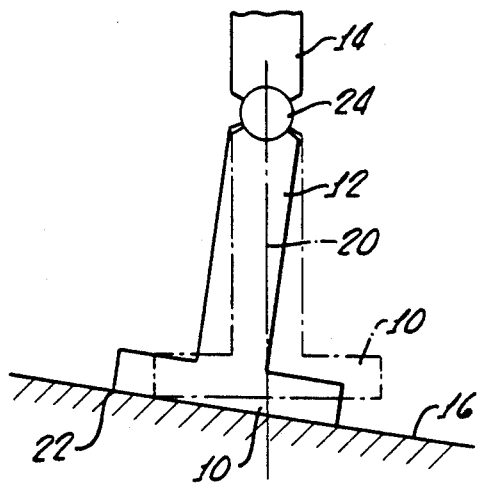
FIG. 1 illustrates tool tip skid that may take place with apparatus of the prior art.

FIG. 1 schematically illustrates tip skid of a typical reflow solder head of the prior art. A reflow solder tip 10, having a fixed mounting arm 12, is pivoted to a movable support or drive ram 14 for vertical motion, as viewed in FIG. 1, toward and away from a tilted workpiece surface 16. The tool tip 10 is typically a thermode or heater bar that is to be pressed against the workpiece and heated while so pressed. Workpiece 16 is illustrated with an exaggerated tilt relative to the direction 20 of travel of the thermode 10 toward and away from the workpiece. The workpiece 16 may comprise an effectively discontinuous surface formed by a plurality of closely adjacent but mutually spaced thin leads (not shown) which have been pre-tinned and are to be soldered to pre-tinned connecting pads respectively underlying each of the leads.

With the tiltable arrangement of the illustrated prior configuration the workpiece moves down to a first position, illustrated in dotted lines in FIG. 1, at which an edge 22 of the tool tip 10 initially contacts the tilted surface of the workpiece 16. Continued downward motion of the tool tip toward the workpiece causes the tool tip to rotate so as to align itself with the surface of the workpiece, as indicated in solid lines in FIG. 1. A pivotal connection 24 is provided between the drive ram 14 and the support arm 12 that is fixedly connected to the tool tip 10. This pivotal connection allows rotation of the tool tip for the necessary alignment with the tilted surface 16. However, as can be seen in the drawing, the tilting of the tool tip about the pivot point 24 moves the tool tip from the dotted line position to the solid line position of FIG. 1, which requires significant lateral motion of the tool, particularly causing a lateral sliding motion of the edge 22 of the tool tip toward the left as viewed in FIG. 1. This lateral sliding motion while the tool tip is being pressed downwardly against the workpiece may cause significant damage to the fragile and delicate leads that are being soldered. Damage due to the lateral motion or tip skid of the tool tip is present whether the tool tip is compliantly mounted about a pivot axis spaced above the work surface or a pivot point positioned at the work surface, as by some virtual pivot type of mechanism.

Figure 2:
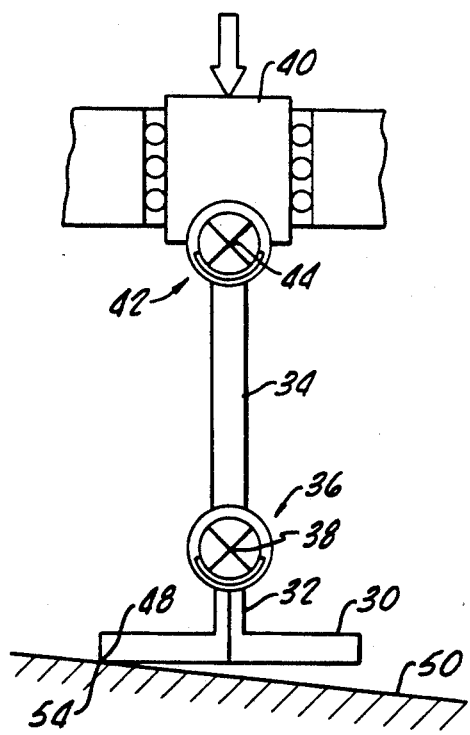
FIG. 2 illustrates principles of the invention showing a tool tip at its point of initial contact.

To eliminate this tip skid, applicant has devised a mounting arrangement that enables the tool tip to rotate about its initial point of contact, at its edge 22, without exhibiting any lateral motion or tip skid. To this end a double pivot mounting structure is provided, as shown in FIG. 2. FIG. 2 illustrates a thermode or heater bar 30 having a fixed centrally positioned connecting arm 32 that is pivoted to an intermediate drive arm or double pivot link 34 by means of a pivot 36, having a pivot axis 38 that is perpendicular to the direction of driving motion of the tool tip, and, in the illustration, is perpendicular to the plane of the paper.

Drive arm 34 is connected to a movable tool tip support or drive ram 40 by means of a second pivot 42, having a pivot axis 44 parallel to the pivot axis 38 and nominally aligned with the pivot axis 38 along a line bisecting the tool tip and extending perpendicular thereto.

FIG. 2 illustrates the dual pivot self-leveling tool at an initial touchdown position, that is, at a position where, in the course of its downward motion toward the surface, an outer edge 48 of the elongated tool tip initially contacts the tilted reflow surface 50. This initial point of contact, which coincides with the lower lateral edge 48 of tool tip 30, may be also designated as initial contact point 54.

Further downward motion of the drive ram 40 from the position illustrated in FIG. 2 causes the tool tip 30 to rotate about its edge 48 and about the initial contact point 54 on the reflow surface 50. In the course of this rotating motion about contact point 48, pivot 36,38 swings in a circular arc around this contact point 54. This swinging of the pivot point 36,38 includes a component of lateral motion, that is, a motion toward the right as viewed in FIG. 2. If such lateral motion of the pivot 36,38 is not allowed, the edge 48 of the tool tip must move toward the left, as was explained in connection with the prior art illustrated in FIG. 1.

However, according to a feature of the present invention, the pivot 36,38, which is effectively a point fixedly connected to the tool tip, is allowed to move laterally toward the right as the tool tip is driven further downwardly. This is accomplished by mounting this pivot point itself upon the pivotally mounted drive arm (double pivot link) 34. Lateral motion of the lower pivot 36,38 is accommodated by rotation of the drive arm 34 about its own pivotal mounting 42,44 to the drive ram 40. Thus, the tool tip can assume the self-leveling or aligned configuration illustrated in FIG. 3 wherein tool tip 30 is completely aligned with the tilted surface 50, and pivot 36,38 has moved laterally in its rotation about the tool edge 48 and initial contact point 54. No lateral motion of the tool edge 48 has occurred. As the lower pivot 36,38 rotates with the tool tip about contact point 54, drive arm 34 is rotated in a counterclockwise direction (as viewed in FIG. 3) about the upper pivot 42,44 and no tip skid has occurred.

The relative dimensions of the arms 32,34 and the relative stiffness of the pivots 36,42 may be varied according to the size or width (the dimension from left to right as viewed in FIG. 2) of the tool tip 30, as will be discussed below.

In order to ensure that the tool tip rotates about point 54 without skid, sufficient force (normal to the surface) must be exerted at the contact point to provide enough friction to prevent skid at this point. To increase friction resistance at the initial contact point, the pivot 36 is made relatively stiff so that a relatively larger force is required to pivot the tool tip about point 54. Concomitantly, the upper pivot 42 is made relatively less stiff (with a smaller spring constant) so as to provide lesser resistance to lateral motion of the lower pivot axis 38 as the tool tip rotates around contact point 54. For a relatively greater width of the thermode 30, that is a greater dimension from left to right as viewed in FIG. 2, there is a greater moment arm between the lower initially contacting edge 48 and pivot axis 38. Accordingly for greater widths of the thermode 30, increased stiffness of the pivot 36 is required. In addition, a longer driver arm 34 is employed for such greater width of thermode so as to allow a greater range of lateral motion of the lower pivot 36. This also increases the moment arm that acts about upper pivot 42, thus decreasing the required resistance of pivot 42 to lateral motion of lower pivot 36.

For smaller widths of the thermode 30, a smaller moment arm created enough normal force and friction at the contact point for rotation of arm 34 as the thermode rotates to align itself with the tilted surface. Accordingly the drive arm 34 may be of considerably decreased length in such a situation so that the two pivot axes 38 and 44 may be relatively close to one another. An arrangement of this type is shown in FIGS. 4–9 and described below.

One constraint in the geometry of the links is caused by the fact that the force applied to the thermode is applied through the lower pivot axis 38 and in a direction along the length of the drive arm 34. Thus the axis of drive arm 34 must at all times intersect the base of the thermode. If the geometry were such as to cause the axis of link 34 to be so tilted relative to the thermode base that the axis of link 34 falls outside of the thermode, there would exist a force tending to overturn the thermode, which is highly undesirable. The arrangements described herein are suitable for expected tilt of the reflow surface within the range of ±2° with respect to a perpendicular to the vertical direction of thermode travel.

Figure 3:
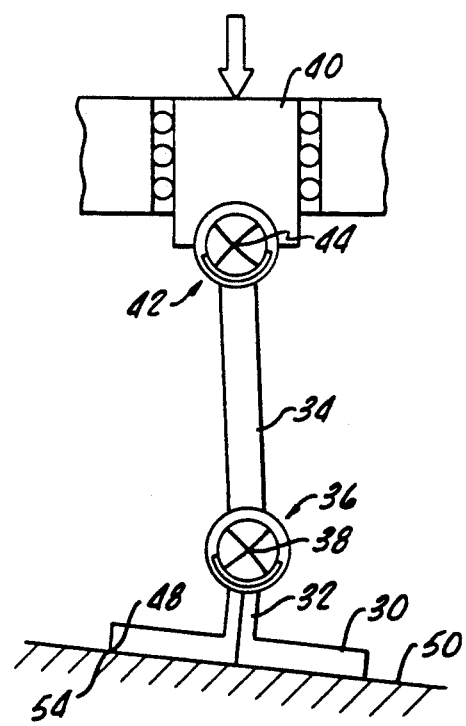
FIG. 3 shows the relation of parts of the apparatus of FIG. 2 after the tool tip has rotated to align itself with the workpiece surface.

The described apparatus operates in conventional manner by causing the drive ram 40 to drive the thermode mounting mechanism, which includes arms 32,34 and pivots 36,42, downwardly toward the workpiece, which rotates about its initial contact point, until it attains the self-aligning position illustrated in FIG. 3. On attaining the self-aligned position of FIG. 3, with sufficient pressure exerted (as by conventional compliant mounting of the drive ram 40), electric current is caused to flow through the thermode 30, thereby raising its temperature to cause the solder of the pre-tinned parts to flow. The thermode is then allowed to cool so that the flowed solder can solidify, and the mechanism is then raised and moved toward another solder position. Lateral motion of the entire solder apparatus to different solder locations is provided either by conventional lateral motion of the mounting of drive ram 40 or by mounting of the reflow surface 50 upon a worktable that itself is mounted for motion in two mutually orthogonal directions normal to the vertical direction of the drive motion of the thermode.

The pivots 36,42 are schematically illustrated as flexural pivots, such as a Bendix flexure or flexural pivots to be described below, to facilitate adjustment of relative stiffness of the two pivots.

If the width of the thermode is small, in the order of 0.2 to 1 inch for example, the moment arm from pivot axis 38 (see FIG. 2) to the initial contact point 54 in the plane of the paper, is sufficiently small so that more force is required at the lower pivot 36 to rotate the thermode. More force at contact point 54 creates more friction, making the rotation at the upper pivot 44 significantly easier. If the thermode width is greater, in the order of 1 to 2 inches or more for example, rotation of pivot 36 is easier and friction at point 54 decreases. This makes the pivot 44 more difficult to rotate. This may be remedied by increasing the stiffness of the lower pivot 36 by using a different type of flexure or adding springs to the flexures, and/or decreasing stiffness of pivot 42,44.

Illustrated in FIG. 4 is a reflow solder head mechanism of substantially conventional design employing improved double pivot tool tip mounting of the present invention. A housing 60 mounts a vertically driven ram drive arm 62 which is clamped to a double pivot mounting block 64 carrying a double pivot mechanism 66 that provides a movable mounting for a tool tip, such as a thermode 68 adapted to be moved up and down with respect to a workpiece (not shown in FIG. 4) mounted on a work table 70.

Figure 7:
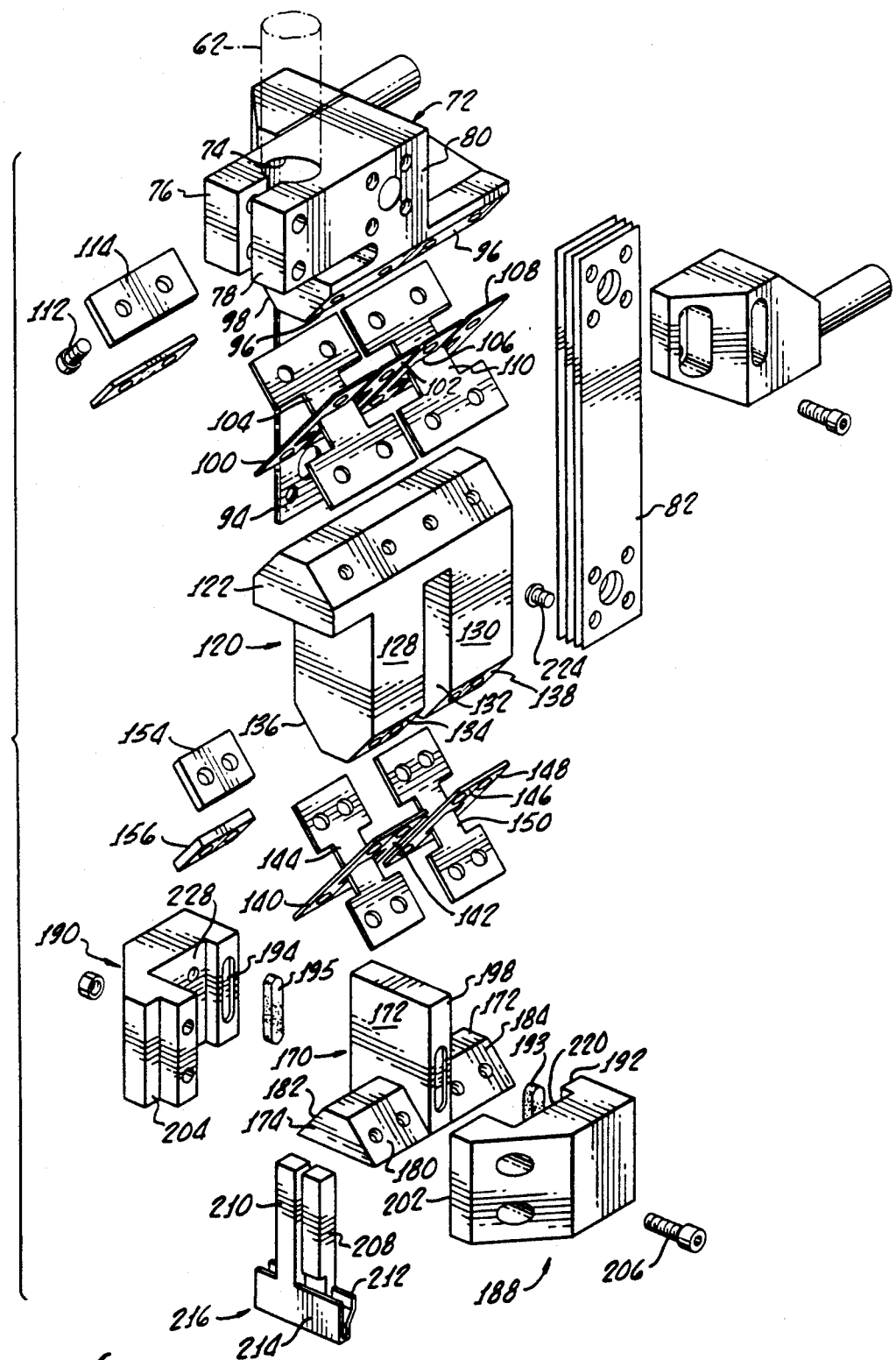
FIG. 7 is an exploded pictorial illustration of the double pivot mounting of the tool tip.

Construction and configuration of the assembled parts of a double pivot mounting mechanism 66 for the tool tip 68 is shown in section in FIGS. 5 and 6 but is most readily visualized by reference to the exploded pictorial view of FIG. 7. A double pivot mounting block 72 includes a split bore 74 receiving drive ram 62, which is fixedly clamped to block 72 by clamp arms 76,78 that are squeezed together by means of bolts (not shown in FIG. 7). The ram is driven up and down by conventional mechanisms (not shown). An outer flat surface portion 80 of the mounting block 72 receives upper ends of a plurality of thin, flexible and bent wide copper sheets comprising flexible electrical conductors 82 which are clamped against the mounting block by means of a cable terminal 84 and bolts, such as bolt 86, which extend through the terminal and through an upper end of the shunt conductors 82 to securely mechanically connect the upper ends of the shunt conductors to the mounting block 72 and to electrically connect the conductors to a power cable 90. An identical arrangement is provided for the opposite side of mounting block 72 to mount an identical set of bowed shunt conductors 94 connected to a second power cable (see FIG. 5).

The lower end of double pivot mounting block 72 is formed with right and left downwardly converging inclined flexure mounting surfaces 96,98. Two axially spaced and axially aligned upper pivots are provided by two sets of upper flexures. A first set comprises a pair of C-shaped (see FIG. 8) outside flexures 100,102, which flank an upper inside I-shaped flexure 104 (see FIG. 9). A second identical upper pivot, on the same axis as the first pivot, is provided by a pair of C-shaped flexures 106,108 flanking an upper inside I-shaped flexure 110. The inside flexures provide wider ends to facilitate secure mounting to the mounting block. Each of the flexures is formed of a thin sheet of spring steel having a predetermined size, thickness and stiffness, as will be described more particularly below. Upper ends of each of the outside flexures 106,108 are bolted to the inclined surface 96 of double pivot mounting block 72, and upper ends of the inside flexures 104,110 are similarly bolted to the other inclined surface 98 of the double pivot mounting block 72. These upper portions of the flexures are secured by means of bolts, such as bolt 112, and reinforcing plates, such as reinforcing plate 114, to fixedly attach the upper ends of these flexures to the opposite inclined sides of the double pivot mounting block. Not all bolts and reinforcing plates are shown in FIG. 7, but all flexure ends are mounted in the same manner by such bolts and plates. The inclined sides 96,98 are inclined at about 45° to the vertical so that the two surfaces, and of course the flexures secured thereto, will lie in planes intersecting at a 90° angle (see FIG. 5).

A drive arm in the form of a double pivot link, generally indicated at 120, includes a link head 122 having first and second upwardly converging inclined flexure mounting surfaces 124,126 that receive and firmly secure lower ends of the inside flexures and the outside flexures, respectively. Thus the lower ends of the inside flexures 110,104 are bolted to surface 124 of the double pivot link head 122 by means of bolts and reinforcing plates (not shown in FIG. 7) and the lower ends of outside flexures 100,102,106 and 108 are similarly fixedly connected by means of bolts and reinforcing plates (not shown in FIG. 7) to the other inclined surface 126 of the double pivot link head.

The double pivot link head 120 includes parallel mutually spaced depending legs 128,130 that form a slot 132 therebetween. Each of the legs 128 and 130 is formed with downwardly converging inclined flexure securing surfaces 134,136 for leg 128 and similar inclined surfaces, such as inclined surface 138 on leg 130. Two sets of lower flexures have upper ends fixedly secured to the inclined mounting surfaces 134,136,138, etc. of the double pivot link legs 128,130. The first of these lower flexure sets includes C-shaped outside flexures 140,142, which flank an I-shaped inner flexure 144. The second set is comprised of C-shaped outside flexures 146,148 that flank a single I-shaped inside flexure 150. Upper ends of the inside and outside flexures of both sets are bolted, as previously described, by means of bolts (not shown) and reinforcing plates, such as plate 154, to the inclined surfaces 134,136,138 etc. of the double pivot link legs 128,130.

A bottom pivot mounting block 170 includes an upstanding mounting plate 172 flanked by and rigidly connected to pivot blocks 174,176, respectively. Each pivot block 174,176 is formed with a pair of upwardly converging inclined flexure mounting surfaces 180,182 for block 174 and surface 184 and an opposite surface (not shown in FIG. 7) for block 176. Lower ends of the flexures of the lower sets are fixedly bolted to the surfaces 180,182,184 etc. in the same manner as the lower ends of the upper flexures are bolted to the upper end of the double pivot link. Thus the lower end of inside flexure plates 144,150 are bolted by means of bolts and reinforcing plates (such as plate 156) to pivot block surfaces 180,184, and the lower ends of outside flexures 140,142,146 and 148 are bolted by means of bolts and reinforcing plates (not shown) to the mounting surfaces 182 and the opposite surface of block 176 in the manner previously described. Upstanding mounting plate 172 of the bottom pivot mounting block 170 extends into the slot 132 between legs 128 and 130 of the double pivot link 120 to provide fore and aft stability for the bottom pivot mounting block 170, which is pivotally connected by means of the sets of bottom flexures to the double pivot link 120.

First and second substantially U-shaped electrode mounts 188,190 have inwardly projecting rear legs 192,194, respectively, which are clamped to opposite edges, such as edge 198 of the upstanding mounting plate 172 of the bottom pivot mounting block. Interposed between rear legs 192,194 and the opposite edges of mounting plate 172 are insulating spaces and alignment keys 193,195 which are received in keyways formed in the legs 192,194 and sides of plate 172. Opposite sides of the bottom pivot mounting block have forward legs 202,204 that project forwardly of the bottom pivot mounting block. Bolts, such as bolts 206 (of which only one is shown in FIG. 7) clamp the forward legs 202,204, urging these toward and against interposed electrode connecting blocks 208,210, which are thus securely but detachably mounted to the electrode mounts 188,190. Keys 193,195 allow pivotal motion of the electrode mounts to clamp electrode blocks 208,210. Connecting blocks 208,210 are fixedly and electrically connected to opposite sides 212,214 of a substantially elongated thermode or heater bar 216 that is roughly U-shape in cross section. Between the legs 192,202 of electrode mount 188 is a recess 220 which receives the lower ends of shunt conductors 82, which are fixedly connected in the recess, both mechanically and electrically, by means of bolts, such as a bolt 224 (there being four such bolts at each end of the conductors 82). Similarly, electrode mount 190 includes a recess 228 which receives the lower ends of shunt conductors 94, which are bolted thereto and thus mechanically and electrically connected to the electrode mounts.

The overall arrangement described and illustrated in FIGS. 4 through 8 includes a tool tip such as thermode 216 pivotally connected by lower flexure plates 140 through 150 to the lower end of the double pivot link or drive arm 120, which in turn has its upper end pivotally connected by the upper sets of flexure links 100 through 110 to the drive ram 62 by means of the double pivot mounting block 72. The upper and lower pivot axes of the upper and lower sets of flexures are positioned, as can be seen in FIGS. 5, at points 240 and 242, which are aligned with one another and lie on a vertical line extending through the center of the thermode 216. The two pivots allow rotation of the thermode about its initial point of contact, as previously described, without tip skid. A first pivotal motion is motion of the thermode 216 about an initial point of contact, and the second pivotal motion is motion of the lower pivot point 242 to accommodate rotational motion of the thermode 2126. The arrangement operates just as described in connection with the schematically illustrated arrangement of FIGS. 2 and 3, except that in the embodiment illustrated and detailed in FIGS. 4 through 9 the intermediate or double pivot link 120 is relatively shorter.

As mentioned above in connection with the description of FIGS. 2 and 3, the lengths of the double pivot link 220 and the horizontal moment arm or effective width of the heater bar itself, and stiffness of the pivots may be varied according to different conditions and to obtain different operations. Thus a double pivot link 120 in the configuration illustrated in FIGS. 4 through 7 may have a length of 0.80 inches (a vertical dimension from top to bottom as illustrated in FIG. 7), for a thermode having a length of about 0.75 inches or less. In the exemplary configuration of FIG. 7 the lower flexures 140-150 are made of a stainless steel having a thickness of 0.010 inches and have a width and length of the flexing portions thereof of 0.150 wide by 0.170 long for the outside flexures, and a width of 0.300 and a length of 0.170 of the flexing portion of the inside flexures. The upper flexures 100-110 are made of thinner material, such as 0.004 stainless steel but have greater width so that, for example, the upper outside flexures have flexing portions of 0.250×0.250 inches in width and length, respectively, whereas the upper inside flexures, such as flexure 104, has a flexing portion of 0.500 inches wide by 0.250 inches in length. The net result is a relatively increased stiffness in the lower pivot as compared to the stiffness of the upper pivot.

For use with a wider thermode or heater bar, the length of the double pivot link may be increased to about 2.430 in a particular embodiment, whereas the length of the double pivot link 120 in the arrangement of FIG. 7 is 0.80 inches.

It will be readily appreciated that but a single set of upper flexures and a single set of lower flexures, such as the upper set 100,102,104 and the lower set 140,142,144 may be employed. However, to improve fore and aft stability and to better resist tendency of the mechanism to twist about an axis perpendicular to the axis of the drive ram and perpendicular to the pivot axis of the flexure pivots, the pivot flexures are provided in double sets, as illustrated in FIGS. 4 through 7. Electric current is carried to and through the heater bar from the cable 90 through the shunt conductors 82 on either side, through the electrode mounts on either side and thence to the respective electrode bars 208,210 so that current flows from one side to the other through the heater bar to generate the desired heat.

What is claimed is:

1. A self-leveling tool comprising:
    a tool tip adapted to be moved in a selected direction to be pressed against a workpiece surface that has an unknown tilt relative to that direction, drive arm means for moving said tool tip in said direction toward said workpiece, said drive arm means having a pivotal connection to said tool tip, whereby said tool tip tends to tilt upon initial contact with a tilted workpiece, and means for mounting said drive arm means to enable lateral motion of said pivotal connection, wherein said means for mounting comprises a drive ram and wherein said drive arm means comprises a double pivot link pivotally connected at one of its ends to said tool tip and at its other end to said drive ram and wherein said pivot connections have mutually different stiffnesses.

2. The tool of claim 1 wherein said means for mounting comprises a movable support, and means for movably connecting said drive arm means to said support for motion of said drive arm means transverse to said direction.

3. The tool of claim 2 wherein said means for movably connecting comprises a pivotal connection between said drive arm means and said support.

4. The tool of claim 2 wherein said tool tip comprises a reflow soldering bar.

5. A self-leveling tool comprising:
a tool tip adapted to be moved in a selected direction to be pressed against a workpiece surface that has an unknown tilt relative to that direction,
drive arm means for moving said tool tip in said direction toward said workpiece, said drive arm means having a pivotal connection to said tool tip, whereby said tool tip tends to tilt upon initial contact with a tilted workpiece, and
means for mounting said drive arm means to enable lateral motion of said pivotal connection, wherein said means for mounting comprises a drive ram and wherein said drive arm means comprises a double pivot link pivotally connected at one of its ends to said tool tip and at its other end to said drive ram, wherein said double pivot link comprises a rigid body having an upper end formed with a pair of upwardly converging inclined surfaces and a lower end formed with a pair of downwardly converging inclined surfaces, and wherein the pivotal connection between said drive arm means and said support comprises an upper set of flexure strips fixed at one end to said upwardly converging surfaces of said double pivot link and at the other end to said drive ram, and including a set of lower flexure pivot strips fixedly connected at one end thereof to said downwardly converging surfaces of said double pivot link and fixedly connected at the other end thereof to said tool tip.

6. A self-leveling tool comprising:
a tool tip adapted to be moved in a selected direction to be pressed against a workpiece surface that has an unknown tilt relative to that direction,
drive arm means for moving said tool tip in said direction toward said workpiece, said drive arm means having a pivotal connection to said tool tip, whereby said tool tip tends to tilt upon initial contact with a tilted workpiece, and
means for mounting said drive arm means to enable lateral motion of said pivotal connection, wherein said means for mounting comprises a drive ram and wherein said drive arm means comprises a double pivot link pivotally connected at one of its ends to said tool tip and at its other end to said drive ram, comprising a double pivot mounting block fixed to said drive ram and having a pair of downwardly converging flexure connecting surfaces at a lower end thereof, said double pivot link comprising a body having an upper end with a pair of upwardly converging flexure connecting surfaces and a lower end having a pair of downwardly converging flexure connecting surfaces, and including a bottom pivot mounting block fixed to said tool tip, said bottom pivot mounting block have a pair of upwardly converging flexure connecting surfaces, a first set of lower flexure plates having lower ends connected to the flexure connecting surfaces of said bottom pivot mounting block and upper ends connected to the flexure connecting surfaces of the lower end of said double pivot link, and a second upper set of flexure plates having lower ends connected to the upwardly converging surfaces of said double pivot link and having upper ends connected to the downwardly converging surfaces of said double pivot mounting block.

7. The tool of claim 6 including flexible bent conductive strips having upper ends fixed to said double pivot mounting block and lower ends fixed to said bottom pivot mounting block.

8. The tool of claim 6 including first and second cable terminals fixed to said double pivot mounting block, first and second groups of flexible electrical conductors having upper ends fixed to and between said double pivot mounting block and said first and second terminals respectively, first and second electrode mounting blocks respectively connected to opposite sides of said bottom pivot mounting block, said tool tip having first and second electrodes connected respectively to said electrode mounting blocks, said first and second groups of flexible electrical conductors having lower ends connected mechanically and electrically to said first and second electrode mounting blocks respectively.

9. A self-leveling tool comprising:
a tool tip adapted to be moved in a selected direction toward a workpiece surface that is tilted with respect to that direction, said tool tip extending perpendicular to said direction,
a drive ram, and
a double pivot link pivoted to said tool tip and to said drive ram at mutually spaced pivot connections, wherein said pivot connections comprise flexural pivots having mutually parallel axes,
wherein said pivot connections have mutually different stiffnesses.

10. The tool of claim 9 wherein said pivot connections have mutually parallel axes each intersecting a line through a midpoint of said tool tip and parallel to said selected direction.

11. Self-leveling reflow solder apparatus comprising:
a heater tip,
a support,
a driver on said support for driving said heater tip toward and away from a workpiece, and
an articulated linkage interconnecting said driver and heater tip, said linkage comprising:
a double pivot link having one end pivoted to said tool tip and having a second end pivoted to said driver,
wherein said heater tip is adapted to be pressed against a workpiece surface having a tile not greater than a maximum tilt, and wherein said pivoted ends are positioned and said link has a length that causes maximum articulation of said link when said heater tip is pressed against said tilted surface, said link having an axis on a line that intersects said heater tip when link sections have said maximum articulation, wherein said link ends are pivoted to said tool tip and said driver about mutually parallel axes, wherein said link ends are pivoted to said tool tip and said driver by flexural pivots having mutually different stiffnesses.

12. Reflow soldering apparatus comprising:

a thermode adapted to be moved in a selected direction toward a workpiece that has an unknown tilt relative to said direction, whereby an edge of said thermode will contact said workpiece at an initial contact point, and whereby further motion of said thermode past said initial contact point will cause said thermode to rotate to align itself with said workpiece, drive means for moving said thermode in said direction, and mounting means coupling said thermode to said drive means for allowing the thermode to rotate about said contact point without translation of the thermode relative to the workpiece, wherein said mounting means includes first and second pivots nominally lying on a line parallel to said direction and extending through the center of the thermode, wherein said mounting means includes a double pivot link connected to said drive means and to said thermode by said first and second pivots, respectively, wherein said first pivot has first stiffness and wherein said second pivot has a stiffness greater than said first stiffness.

* * * * *